United States Patent
Cheaz et al.

(10) Patent No.: US 10,440,261 B2
(45) Date of Patent: Oct. 8, 2019

(54) AUTOMATIC SELECTION OF A CAMERA BASED ON FACIAL DETECTION

(71) Applicant: International Business Machines Corporation, Armonk, NY (US)

(72) Inventors: Nixon Cheaz, Cary, NC (US); Anthony M. Diaz, Durham, NC (US); Richard A. Gebhardt, Raleigh, NC (US); Rohit Shetty, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 15/477,694

(22) Filed: Apr. 3, 2017

(65) Prior Publication Data

US 2018/0288312 A1  Oct. 4, 2018

(51) Int. Cl.
| | |
|---|---|
| H04N 5/232 | (2006.01) |
| H04H 60/33 | (2008.01) |
| G06K 9/00 | (2006.01) |
| H04M 1/725 | (2006.01) |
| H04N 5/225 | (2006.01) |
| G06K 9/22 | (2006.01) |
| H04N 21/442 | (2011.01) |

(Continued)

(52) U.S. Cl.
CPC ..... *H04N 5/23219* (2013.01); *G06K 9/00255* (2013.01); *G06K 9/00288* (2013.01); *G06K 9/22* (2013.01); *H04H 60/33* (2013.01); *H04M 1/72569* (2013.01); *H04N 5/2258* (2013.01); *H04N 5/23222* (2013.01); *H04M 2250/52* (2013.01); *H04N 21/41407* (2013.01); *H04N 21/4223* (2013.01); *H04N 21/44218* (2013.01); *H04N 21/4788* (2013.01)

(58) Field of Classification Search
CPC .......... H04N 5/23219; H04N 21/4223; H04N 21/4415; H04N 21/44218; H04H 60/33; G06K 9/00221; G06K 9/00268; G06K 9/00288
USPC ....... 1/1; 386/224; 345/204, 156; 348/222.1; 382/118
See application file for complete search history.

(56) References Cited

U.S. PATENT DOCUMENTS

2007/0274703 A1* 11/2007 Matsuda ................ G03B 13/12
 396/264
2010/0266206 A1* 10/2010 Jo ....................... G06K 9/00261
 382/190

(Continued)

*Primary Examiner* — Thai Q Tran
*Assistant Examiner* — Stephen R Smith
(74) *Attorney, Agent, or Firm* — Schmeiser, Olsen & Watts, LLP; Maeve Carpenter (57) ABSTRACT

A camera selection system and method for automatically selecting an appropriate camera to use for capturing photos and videos is provided. The method includes the steps of detecting that a camera application has been opened, activating a first camera and a second camera of the mobile device, analyzing a feed received from the first camera and a feed received from the second camera to detect whether a face is present in a field of view of the first camera or the second camera, determining that the user intends to use the first camera based on a detection of the face in the field of view of the first camera, deactivating the second camera in response to the determining and displaying the feed received from the first camera on the main display of the mobile device for viewing by the user while using the camera application.

17 Claims, 7 Drawing Sheets

(51) Int. Cl.
*H04N 21/4223* (2011.01)
*H04N 21/414* (2011.01)
*H04N 21/4788* (2011.01)

(56) References Cited

U.S. PATENT DOCUMENTS

| | | | |
|---|---|---|---|
| 2011/0216209 A1* | 9/2011 | Fredlund | H04N 1/00488 348/211.99 |
| 2014/0285476 A1* | 9/2014 | Cho | G06F 1/1601 345/204 |
| 2014/0361986 A1* | 12/2014 | Won | H04N 1/00307 345/156 |
| 2015/0229837 A1* | 8/2015 | Her | H04N 5/23219 348/222.1 |
| 2015/0264302 A1 | 9/2015 | Chastney et al. | |
| 2015/0350505 A1* | 12/2015 | Malkin | H04N 5/2257 348/357 |
| 2016/0241783 A1* | 8/2016 | Fukui | H04N 5/23245 |
| 2016/0301832 A1* | 10/2016 | Xu | H04N 5/232 |
| 2016/0378788 A1* | 12/2016 | Panneer | H04N 5/23245 382/118 |

* cited by examiner

AUTOMATIC SELECTION OF A CAMERA BASED ON FACIAL DETECTION

TECHNICAL FIELD

The present invention relates to systems and methods of a camera selection system, and more specifically to embodiments of a camera selection system and method that automatically selects an appropriate camera to use for capturing photos and videos.

BACKGROUND

Many mobile devices and smartphones include a camera on a front of the device and a camera on a rear of the device. The camera on the rear of the device is most often used by the user to take standard photographs. The camera on the front of the device is most often used by the user to take photographs of themselves, known as "selfies."

SUMMARY

An embodiment of the present invention relates to a method, and associated computer system and computer program product, for automatically selecting an appropriate camera to use for capturing photos and videos. A processor of a computing system detects that a camera application loaded on the computing system has been opened by a user. A first camera located on a first side of a mobile device and a second camera located on a second side of the mobile device is activated in response to the detecting, the first camera facing a user and being located on a same side as a main display of the mobile device. A feed received from the first camera and a feed received from the second camera is analyzed to detect whether a face is present in a field of view of the first camera or the second camera. The processor determines that the user intends to use the first camera based on a detection of the face in the field of view of the first camera. The second camera is deactivated in response to the determining, and the feed received from the first camera is displayed on the main display of the mobile device for viewing by the user while using the camera application.

DETAILED DESCRIPTION

Smartphones, tablets, mobile devices, and the like, that have at least two cameras allow a user to take a normal or standard picture with a camera located on a backside of the device, as well as take a self-portrait photograph, known as a "selfie" with a camera located on a front side of the device. Current devices and methods require a smartphone or mobile device operator to provide instructions to the device as to which camera front or rear) to use, based on the type of photo or video the user desires. For example, if the user intends to take a "selfie," then the user must press a button, touch a screen, or issue a voice command to instruct the device to use the front side camera, which sometimes requires the camera application to swap from a default use of the rear camera to a new use of the front camera. Interacting with the device to provide an instruction or selection of the camera to use the front or rear camera can result in a less than exceptional user experience, and can delay the photograph or video taking. Further, users can miss the button on the screen to switch the camera, or new users of a device may not know where the button is to switch the camera, causing further delays.

Thus, a need exists for an automatic camera selection system and method that automatically determines an appropriate camera to use for capturing a photo or video, based on a positioning of the user and/or objects to be captured by the device's cameras.

Figure 1:
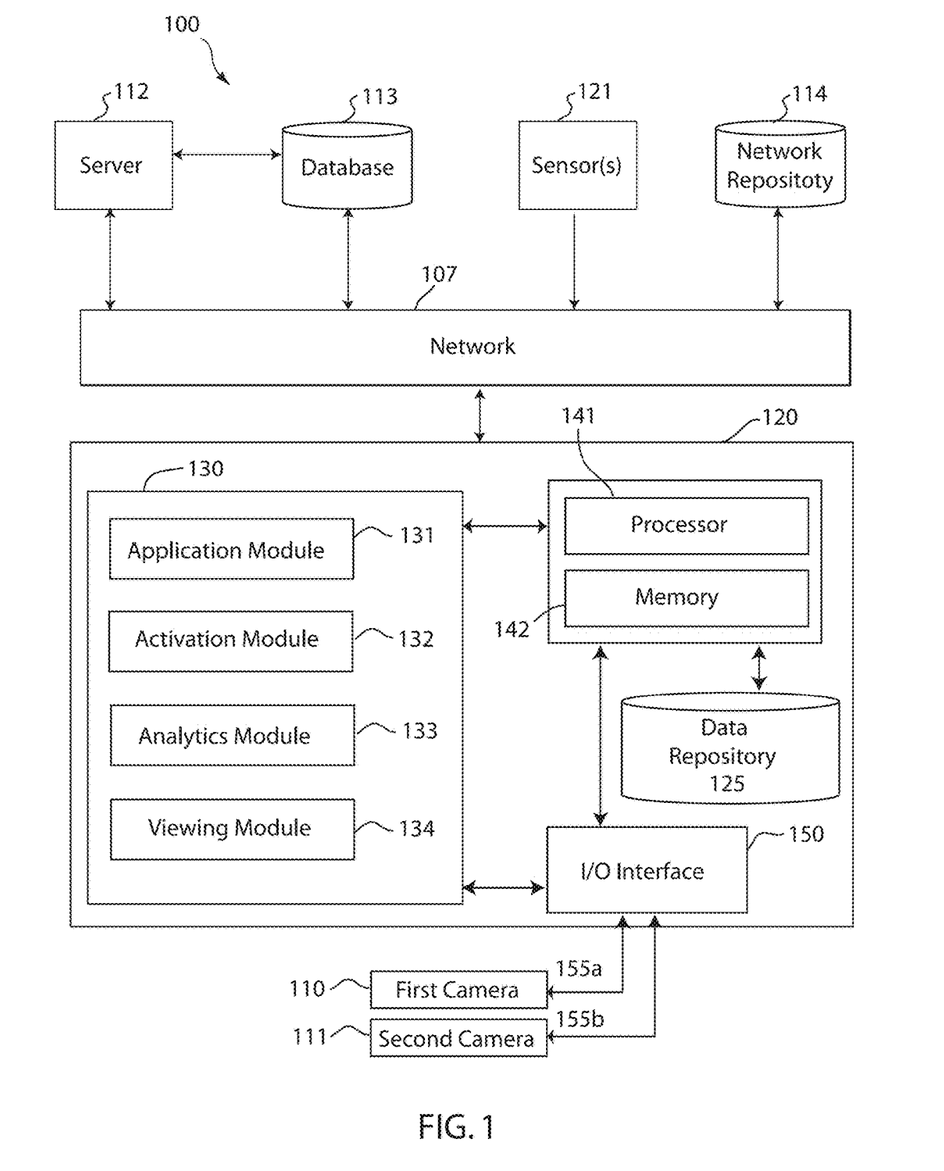
FIG. 1 depicts a block diagram of a camera selection system, in accordance with embodiments of the present invention.

Referring to the drawings, FIG. 1 depicts a block diagram of a camera selection system 100, in accordance with embodiments of the present invention. Embodiments of a camera selection system 100 may include a computing system 120. Computing system 120 may be a computing system of a mobile device, a smartphone, a cellphone, a tablet, an e-reader, a laptop, a portable device, a portable computing device, a smartwatch, and the like. Embodiments of a camera selection system 100 may comprise a first camera 110 and a second camera 111 coupled to a computing system 120 via an I/O interface 150. For instance, the first camera 110 and the second camera 111 may be connected via an I/O interface 150 to computer system 120. The number of cameras 110, 111 connecting to computer system 120 via data bus lines 155*a*, 155*b* (referred to collectively as "data bus lines 155) may vary from embodiment to embodiment, depending on the number of cameras present on a mobile device or in the camera selection system 100.

As shown in FIG. 1, a first camera 110 and a second camera 111 may transmit data, such as photographs, videos, audio/visual content, pixel information, effects, date/time information, etc. (e.g. "camera data") captured, collected, or otherwise created by the first camera 110 and/or the second camera 111 by connecting to computing system 120 via the data bus lines 155 to an I/O interface 150. An I/O interface 150 may refer to any communication process performed between the computer system 120 and the environment outside of the computer system 120, for example, the cameras 110, 111. Input to the computing system 120 may refer to the signals or instructions sent to the computing system 120, for example the camera data collected by the cameras 110, 111, while output may refer to the signals sent out from the computer system 120 to the cameras 110, 111.

Figure 2A:
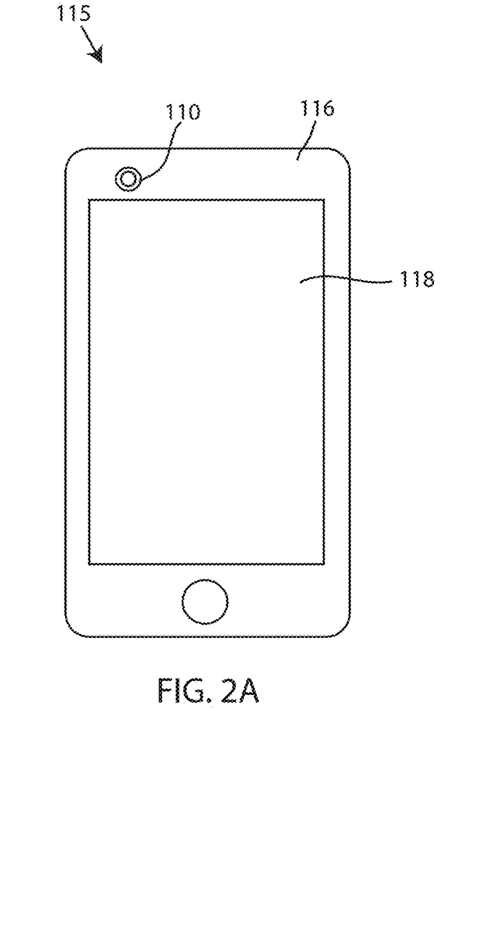
FIG. 2A depicts a mobile device having a first camera on a first side of the mobile device, in accordance with embodiments of the present invention.
Figure 2B:
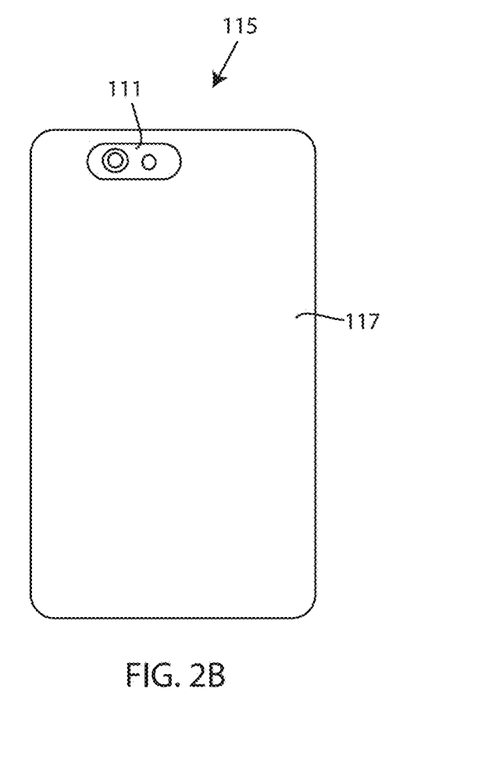
FIG. 2B depicts a mobile device having a second camera on a second side of the mobile device, in accordance with embodiments of the present invention.

FIG. 2A depicts a mobile device 115 having a first camera 110 on a first side 116 of the mobile device 115, in accordance with embodiments of the present invention. Embodiments of the first camera 110 may be located on a same side of the mobile device 115 as a main display 118 of the mobile device 115. The first side 116 of the mobile device 115 may be a front side or surface of the mobile device 115. For instance, embodiments of the first camera 110 located on a first side 116 of the mobile device 115 may face a user when the user holds, uses, operates, or otherwise manipulates the device 115, in a convention manner. In an exemplary embodiment, the first camera 110 on the first side 116 of the mobile device 115 may be used to take "selfies." FIG. 2B depicts a mobile device 115 having a second camera 111 on a second side 117 of the mobile device 115, in accordance with embodiments of the present invention. Embodiments of the second camera 111 may be located on a reverse side of the mobile device 115 as the main display 118 of the mobile device 115. The second side 117 of the mobile device 115 may be a rear or back side or surface of the mobile device 115. For instance, embodiments of the second camera 111 located on a second side 117 of the mobile device 115 may face away from a user when the user holds, uses, operates, or otherwise manipulates the device 115, in a convention manner. In an exemplary embodiment, the second camera 111 on the second side 117 of the mobile device 115 may be used to take a normal or standard photograph or video, (e.g. of people or objects that are facing the user and are a distance away from the user, as the user uses the camera application on the mobile device 115). Accordingly, embodiments of the mobile device 115, which may be computing system 120, includes two or more cameras, that are located on different or opposite sides of the mobile device 115. Further, embodiments of the first camera 110 and the second camera 111 may be referred to as a sensor, an input means, an input mechanism, and the like, for capturing audio/visual content, and operated or controlled by a camera software application loaded on the computing system 120. For example, the computing system 120 may include a camera application that communicates with the cameras 110, 111 to provide instruction and command for the operating of the cameras 110, 111 as known to those skilled in the art.

Referring again to FIG. 1, embodiments of the camera selection system 100 may include a server 112 and an associated database 113. The server 112 may be a remote server associated with a third party camera application that may communicate with the computing system 120 over a network, such as network 107. Photographs or videos captured by the cameras 110, 111 may be transmitted to the server 112 and potentially the database 113 associated with the server 112. The server 112 may be associated with a third party application that may be loaded on the computing system 120, but separate from the camera application of the mobile device 115. For example, the server 112 may service requests made by a third party photo or video application that can operate or otherwise control the cameras 110, 111 of the mobile device 115 to take a photograph or video. In an exemplary embodiment, the computing system 120 communicated with the server 112 and/or database 113 over the network 107. A network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computer system 120, server 112, and database 113, a connection to one or more network accessible knowledge bases containing information of one or more users, network repositories 114 or other systems connected to the network 107 that may be considered nodes of the network 107. In some embodiments, where the computing system 120 or network repositories 114 allocate resources to be used by the other nodes of the network 107, the computer system 120 and network repository 114 may be referred to as servers.

The network repository 114 may be a data collection area on the network 107 which may back up and save all the data transmitted back and forth between the nodes of the network 107. For example, the network repository 114 may be a data center saving and cataloging camera data sent by the first camera 110 and/or the second camera 111 to generate both historical and predictive analysis of users, and to prepare or create a visual timeline of a user with audio/visual content transmitted by the computing system 120. In some embodiments, a data collection center housing the network repository 114 may include an analytic module capable of analyzing each piece of data being stored by the network repository 114. Further, the computer system 120 may be integrated with or as a part of the data collection center housing the network repository 114. In some alternative embodiments, the network repository 114 may be a local repository (not shown) that is connected to the computer system 120.

Referring still to FIG. 1, embodiments of the computing system 120 may receive additional data from one or more sensors 121 which may be positioned within an environment shared by the user, worn by the user, or otherwise disposed in a location that can result in obtaining user data for the detection of a face position of a user and/or proper selection of the camera of the computing system 120. Sensors 121 may be a sensor, an input device, or any input mechanism. For example, sensor 121 may be a biometric sensor, a wearable sensor, an environmental sensor, a camera, a camcorder, a microphone, a peripheral device, a computing device, a mobile computing device, such as a smartphone or tablet, facial recognition sensor, voice capture device, and the like. Embodiments of sensors 121 may further include sensors either worn or placed in a user environment or public environment that the user may be located, such as a kitchen, bedroom, living room, bar, dance club, festival, attraction, and the like. Further embodiments of sensors 121 may include one or more input devices or input mechanisms, including one or more cameras positioned proximate the user or within an environment shared by the user. The one or more cameras (i.e. in addition to or separate from the first camera 110 and second camera 111) may capture image data or video data of a user, including a posture, a facial expression, a gesture, etc., which may be used to assist in the determination of which camera 110, 111 to use. Embodiments of the sensors 121 may also include one or more microphones positioned nearby the user to collect audio relating to the user, which may listen for keyword triggers, such as "selfie" to assist n the determination of which camera 110, 111 to use.

Some or all of the sensors 121 may transmit user data to computing system 120 over network 107. In other embodiments, the sensors 121 may transmit data via data bus lines directly to the computing system 120. Furthermore, embodiments of computing system 120 may communicate with various applications that contain data about the user to also assist in the determination of which camera 110, 111 to use.

Embodiments of the computer system 120 may be equipped with a memory device 142 which may store the camera data, sensor data, and/or user data, and a processor 141 for implementing the tasks associated with the camera selection system 100. In some embodiments, one or more camera applications may be loaded in the memory 142 of the computer system 120. Further, in some embodiments, a camera selection application 130 may be loaded into the memory 142 of the computing system 120. The computing system 120 may further include an operating system, which can be a computer program for controlling an operation of the computing system 120, wherein applications loaded onto the computing device 120 may run on top of the operating system to provide various functions.

With continued reference to FIG. 1, embodiments of computer system 120 may include a camera selection application or module 130. Embodiments of the computing system 120 may include an application module 131, an activation module 132, an analytics module 133, and a viewing module 134. A "module" may refer to a hardware based module, software based module or a module may be a combination of hardware and software. Embodiments of hardware based module include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the application module 131 may include one or more components of hardware and/or software program code for detecting that a camera application loaded on the computing system 120 has been opened by a user. For instance, when a user decides to take a photograph or video, the user may open or otherwise run or activate a camera application on the user's mobile device. Embodiments of the detection module 131 may detect or otherwise become aware that one camera application of potentially a plurality of camera applications has been opened and seeks to initiate control of the first camera 110 and/or second camera 111.

Further, embodiments of the computing system 120 of the camera selection system 100 may include an activation module 132. Embodiments of the activation module 132 may include one or more components of hardware and/or software program code for activating the first camera 110 located on a first side 116 of a mobile device 115 and a second camera 111 located on a second side 117 of the mobile device 115. The activation module 132 may activate or otherwise initiate the first camera 110 and the second camera 111 in response to the detecting of the camera application being opened by the application module 131. Embodiments of the activation module 132 may activate the first camera 110 and the second camera 111 simultaneously, or may activate the cameras sequentially. Further, embodiments of the activation module 132 may activate one or more sensors 121 in communication with the computing system 120, also in response to the detection of the camera application being opened by the application module 131.

The activation module 132 may determine which sensors 121 are located nearby or within a same environment as the user when the user opens the camera application. For instance, the activation module 132 may activate or sync with sensors 121 that are capable of providing data that may assist in the current determination of which camera that the camera selection module 130 should use. Further, the activation module 132 may synchronize the sensors 121 and the cameras 110, 111 so that data being transmitted back and forth is accurate and relevant.

Embodiments of the computing system 120 of the camera selection system 100 may include an analytics module 133. Embodiments of the analytics module 133 may include one or more components of hardware and/or software program code for analyzing a feed received from the first camera 110 and a feed received from the second camera 111 to detect whether a face is present in a field of view of the first camera 110 or the second camera 111. For instance, in response to being activated, the first camera 110 may transmit a live feed data to the computing system 120. The live feed may include a stream of data being transmitted from the first camera 110 to the computing system 120, wherein the live teed may include objects captured by the camera 110 within a field of view of the first camera 110. Embodiments of the analytics module 133 may analyze, scan, review, etc. the feed received from the first camera 110 to detect one or more faces of a user. In an exemplary embodiment, the analytics module 133 may utilize a face detection technology identify and/or detect a human face in a digital image included in the feed received from the first camera 110. The analytics module 133 may use an object-class detection technique having an algorithm that can detect a face of a user. In further embodiments, the analytics module 133 may also use a facial recognition system to detect and/or identify not only human faces, but the exact face of the user of the mobile device 115. For instance, the analytics module 133 may analyze the feed received from the first camera 110 and detect whether a human face is present within the field of view of the first camera 110, and may also identify and confirm that the face present within the field of view is that of the user operating the mobile device 115.

Likewise, embodiments of the analytics module 133 may analyze the feed received from the second camera 111. The analyzing by the analytics module 133 of the feed from the first camera 110 and the feed from the second camera 111 may be performed simultaneously. Alternatively, the analytics module 133 may first analyze the feed received from the first camera 110, and then the feed received from the second camera 111, or vice versa. In response to being activated, the second camera 111 may transmit a live feed data to the computing system 120. The live feed may include a stream of data being transmitted from the second camera 111 to the computing system 120, wherein the live feed may include objects captured by the second camera 111 within a field of view of the second camera 111. Embodiments of the analytics module 133 may analyze, scan, review, etc. the feed received from the second camera 111 to detect one or more faces of a user. In an exemplary embodiment, the analytics module 133 may utilize a face detection technology identify and/or detect a human face in a digital image included in the feed received from the second camera 111. The analytics module 133 may use an object-class detection technique having an algorithm that can detect a face of a user. In further embodiments, the analytics module 133 may also use a facial recognition system to detect and/or identify not only human faces, but the exact face of the user of the mobile device 115. For instance, the analytics module 133 may analyze the feed received from the second camera 111 and detect whether a human face is present within the field of view of the second camera 111, and may also identify and confirm that the face present within the field of view is that of the user operating the mobile device 115.

Furthermore, embodiments of the analytics module 133 may detect whether a face is present in a field of view of the first camera 110 or the second camera 111, and determine which of the first camera 110 or the second camera 111 (or any additional cameras associated with the computing system 120) that the user intends to use or should use. Embodiments of the analytics module 133 may determine that the user intends to use the first camera 110 based on a detection of the face in the field of view of the first camera 110, as a result of analyzing the feeds from the first camera 110 and/or the second camera 111. If the analytics module 133 detects a face of the user operating the mobile device 115 within the field of the view of the first camera 110, then the analytics module 133 may determine that the user intends to take a "selfie." In this embodiment, the viewing module 134 may deactivate the second camera 111 and display the feed received from the first camera 110 on the display 118 of the mobile device, as described in greater detail infra. In an exemplary embodiment, the analytics module 133, prior to a deactivating of the second camera 111 and displaying of the feed from the first camera 110, may confirm, that the user intends to use the first camera 110 by detecting an object placed over or partially over the second camera 111. For instance, the analytics module 133, by analyzing the feed from the second camera 111, may detect an object, such as a hand, a finger, or thumb of the user over or partially over the second camera 111 as the user holds the mobile device 115 while using the camera application. If the object is detected, the determination may be confirmed because the user is holding the mobile device 115 in such a way to take a "selfie" (e.g. cupping the mobile device 115 within the user's hand).

Furthermore, embodiments of the analytics module 133 may optionally perform further analyzing of the feed received from the first camera 110, in response to a detection of a face within the field of view of the first camera 110. For example, the analytics module 133 may determine whether the face is within a predefined proximity to the mobile device 115. If the face of the user is within a certain distance from the mobile device (e.g. 3 feet or closer), then the analytics module 133 may determine that the user intends to take a "selfie," and may select the first camera 110 for use by the camera application. Alternatively, if the face is outside the predetermined proximity, then the analytics module 133 may determine that the user does not intend to take a "selfie," and may select the second camera 111 for use by the camera application. Various different proximities and rules associated with the proximities may vary, such that the selection of the first camera 110 or the second camera 111 may vary depending on the desired proximity and proximity rules. Moreover, the analytics module 133 may also determine whether the detected face is viewed from a point of above the face. In other words, the analytics module 133 may determine whether the mobile device 115 is elevated above the user's face such that the perspective from the first camera 110 shows a front, elevated view of the user's face, as is common with many "selfie" pictures. Additionally, the analytics module 133 may also identify that the face detected is the face of the user, using facial recognition technology. For instance, if the face detected is not the user, then the analytics module 133 may determine that another user is using the mobile device to take a standard photograph of the user. Accordingly, embodiments of the analytics module 133 may determine that the user intends to take a "selfie" and select the first camera 110 for use when a face is detected within the field of view of the first camera 110, the face is within (or outside depending on the proximity rule) a predetermined proximity to the mobile device 115, the camera 110 is positioned above the face, and/or the facial identity of the user is confirmed using facial recognition technology.

If the analytics module 133 does not detect a face within the field of view of the first camera 110, then the analytics module 133 may determine that the user intends to take a standard photograph or video, and the viewing module 134 may deactivate the first camera 110 and display the feed received from the second camera 111 on the display 118 of the mobile device 115, as described in greater detail infra.

Continuing to refer to FIG. 1, embodiments of the computing system 120 may include a viewing module 134. Embodiments of the viewing module 134 may include one or more components of hardware and/or software program code for deactivating one of the first camera 110 and the second camera 111, and displaying, the feed received from the first camera 110 or the second camera 111 on the main display 118 of the mobile device 115 for viewing by the user while using the camera application. Embodiments of the viewing module 134 may deactivate the second camera 111 in response to a determination that the user intends to take a "selfie" and intends to use the first camera 110, and may also display the feed received from the first camera 110 on the main display 118 of the mobile device 115. Alternatively, embodiments of the viewing module 134 may deactivate the first camera 110 in response to a determination that the user intends to take a standard picture or video and intends to use the second camera 111, and may also display the feed received from the second camera 111 on the display 118 of the mobile device 115.

In a different embodiment, the viewing module 134 may display both the feed from the first camera 110 and the second camera 111, in response to the activation module 131 activating the first camera 110 and the second camera 111 when a camera application has been opened. For instance, the viewing module 134 may display the feeds side-by-side on the display 118 so that the riser may select which camera to use.

Figure 3:
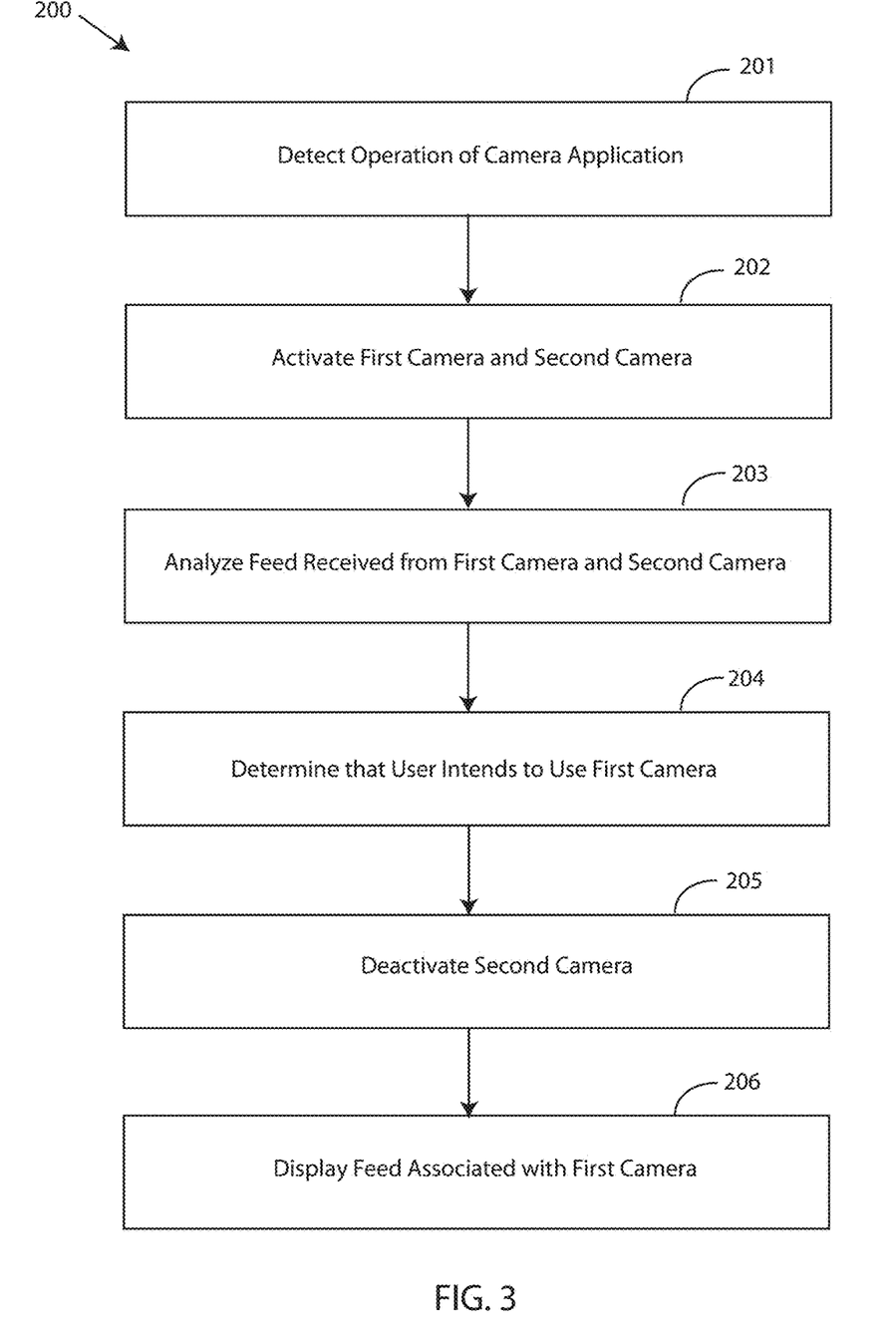
FIG. 3 depicts a flow chart of a method for automatically selecting an appropriate camera to use for capturing photos and videos, in accordance with embodiments of the present invention.

Referring now to FIG. 3, which depicts a flow chart of a method 200 method for automatically selecting an appropriate camera to use for capturing photos and videos, in accordance with embodiments of the present invention. One embodiment of a method 200 or algorithm that may be implemented method for automatically selecting an appropriate camera to use for capturing photos and videos in accordance with the camera selection system 100 described in FIGS. 1-2 using one or more computer systems as defined generically in FIG. 5 below, and more specifically by the specific embodiments of FIGS. 1-2B.

Figure 4:
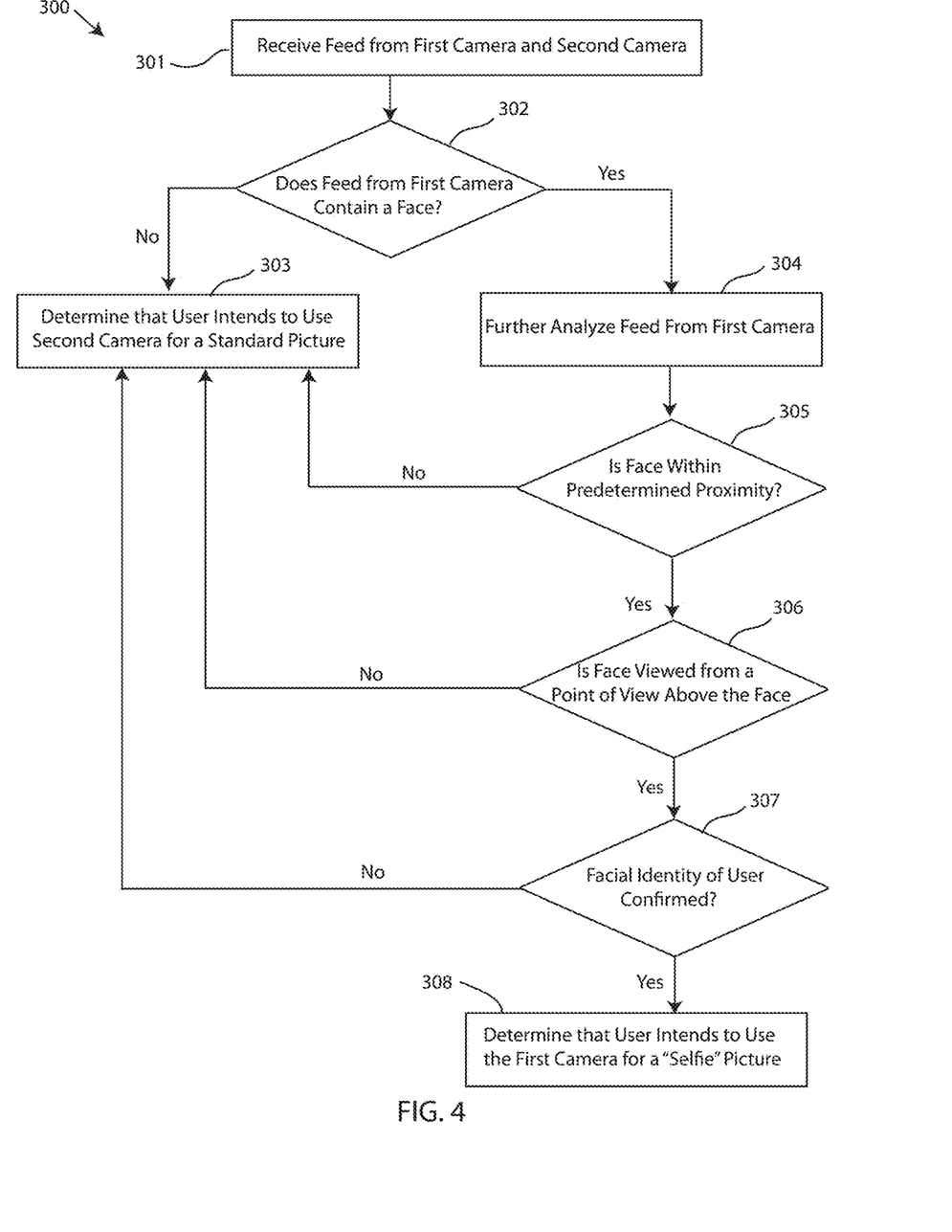
FIG. 4 depicts a flow chart of a step of the method of FIG. 3 for analyzing a feed received from the first camera, in accordance with embodiments of the present invention.

Embodiments of the method 200 method for automatically selecting an appropriate camera to use for capturing photos and videos may begin at step 201 wherein a camera application being opened by the user is detected. Step 202 activates the cameras associated with the mobile device 115, such as the first camera 110 and the second camera 111. The activation of the cameras 110, 111 may be done in response to the detection that the camera application has been opened. Step 203 analyzes the feed received from the first camera 110 and the feed received from the second camera 111. FIG. 4 depicts a flow chart 300 of a step 203 of the method 200 of FIG. 3 for analyzing a feed received from the first camera 110, in accordance with embodiments of the present invention. Step 301 receives a feed from the first and second cameras 110, 111. Step 302 determines whether the feed from the first camera 110 contain a face. If the feed from the first camera 110 does not contain a face, such that no face is detected by the computing system 120, then step 303 determines that the user intends to the use the second camera 111 for a standard picture. If the feed from the first camera 110 contains a face, such that a face is detected by the computing system 120, then step 304 may further analyze the feed from the first camera 110. Step 305 determines whether the detected face is within a predefined proximity with the camera 110, or whether the proximity to the camera is in accordance with proximity rules. For instance, step 305 determines whether the detected face is between 12-36 inches from the camera 110. If the face is not within the predetermined proximity or in compliance with proximity rules, then it is determined that the user intends to the use the second camera 111 for a standard picture, as shown in step 303. If the face is within the predetermined proximity and/or complies with proximity rules, then step 306 determines whether the detected face is positioned below the camera 110. In other words, step 306 determines whether the mobile device has been elevated with respect to an eye level of the user. If the face is not positioned below the camera 110, then it is determined that the user intends to the use the second camera 111 for a standard picture, as shown in step 303. If the face is positioned below the camera 110, then step 307 confirms that the detected face is the face of the user. For example, step 307 may use facial recognition technology to confirm that the detected face is the face of the user, and not another user operating the camera 110. If the facial identity of the user is not confirmed, then it is determined that the user intends to the use the second camera 111 for a standard picture, as shown in step 303. If the facial identity of the detected face is confirmed to be the face of the user, then step 308 determines that the user intends to the use the first camera 110 and that the user intends to take a "selfie." In an exemplary embodiment, steps 304-307 are optionally performed as part of a further analysis, wherein if the feed from the first camera 110 contains a face, such that a face is detected by the computing system 120, then steps 304-307 may be skipped, and the method 300 may move directly to step 308, which determines that the user intends to the use the first camera 110 and that the user intends to take a "selfie."

Referring back to FIG. 3, embodiments of method 200 may include a step 204 that determines, based on the analyzing in step 203, that the user intends to use the first camera 110 (or the second camera 111). Step 205 deactivates the second camera 111 (or the first camera 110 if the determining step 204 determines that the user intends to use the second camera 111). Step 206 displays the feed received from the first camera 110 on the display 118 of the mobile device 115 so that the user may take the intended photograph or video (or displays the feed received from the second camera 111 if the determining step 204 determines that the user intends to use the second camera 111).

Figure 5:
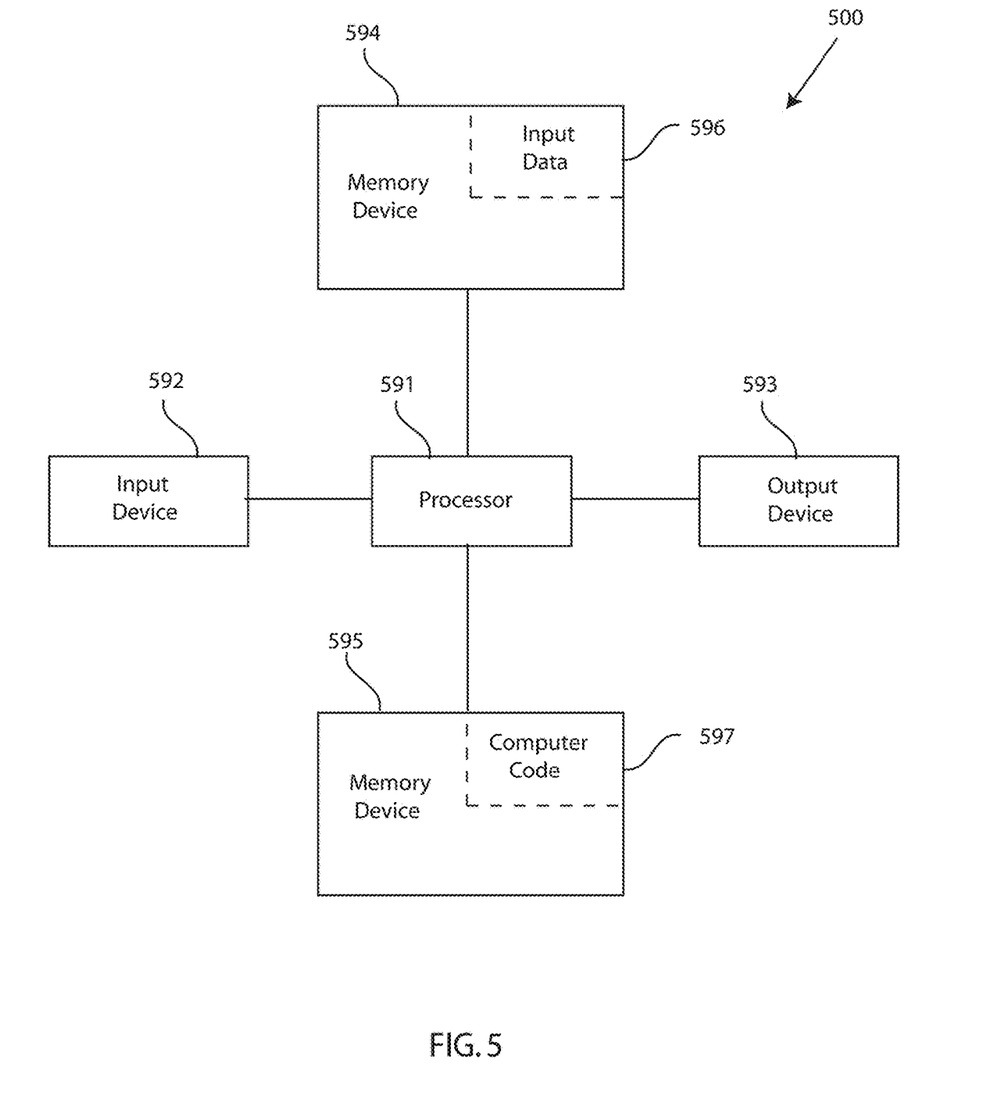
FIG. 5 illustrates a block diagram of a computer system for the camera selection system of FIGS. 1-2B, capable of implementing methods for automatically selecting an appropriate camera to use for capturing photos and videos of FIGS. 3-4, in accordance with embodiments of the present invention.

FIG. 5 illustrates a block diagram of a computer system for the camera selection system of FIGS. 1-2B, capable of implementing methods for automatically selecting an appropriate of use for capturing photos and videos of FIGS. 3-4, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for automatically selecting an appropriate camera to use for capturing photos and videos, in the manner prescribed by the embodiments of FIGS. 3-4 using the camera selection system of FIGS. 1-2, wherein the instructions of the computer code 597 may be executed by processor 591 via memory device 595. The computer code 597 may include software or program instructions that may implement one or more algorithms for implementing the methods for automatically selecting an appropriate camera to use for capturing photos and videos, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 5.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the sensors 110. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to camera selection systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to automatically select an appropriate camera to use for capturing photos and videos. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for automatically selecting an appropriate camera to use for capturing photos and videos. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for automatically selecting an appropriate camera to use for capturing photos and videos.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Compute readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer nay be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention e described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
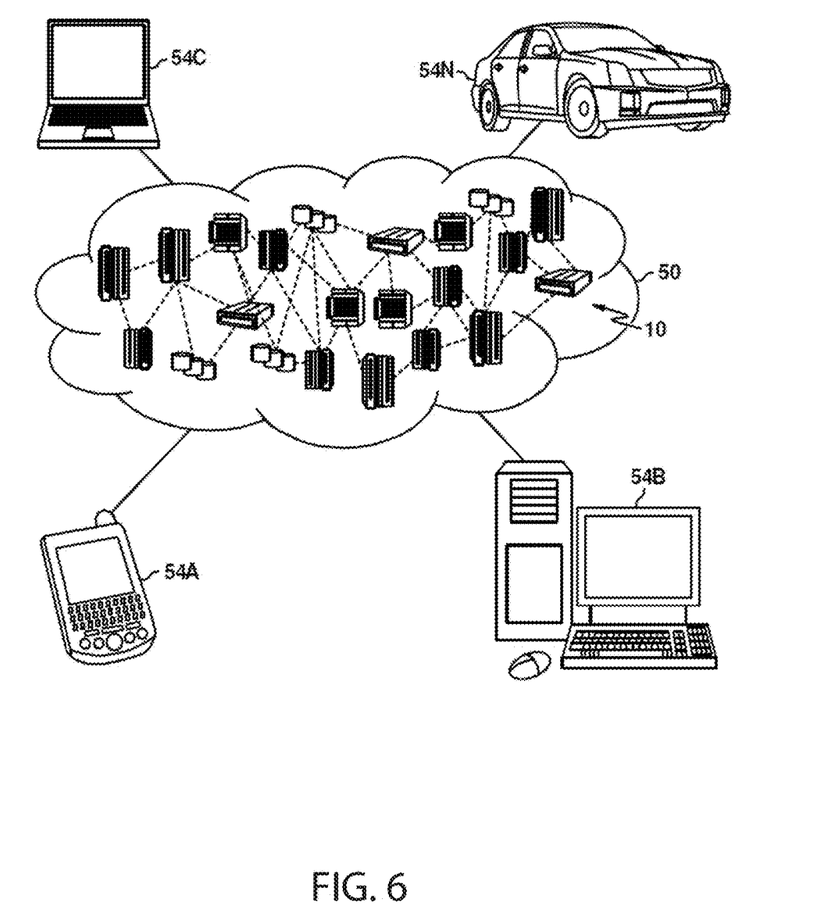
FIG. 6 depicts a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
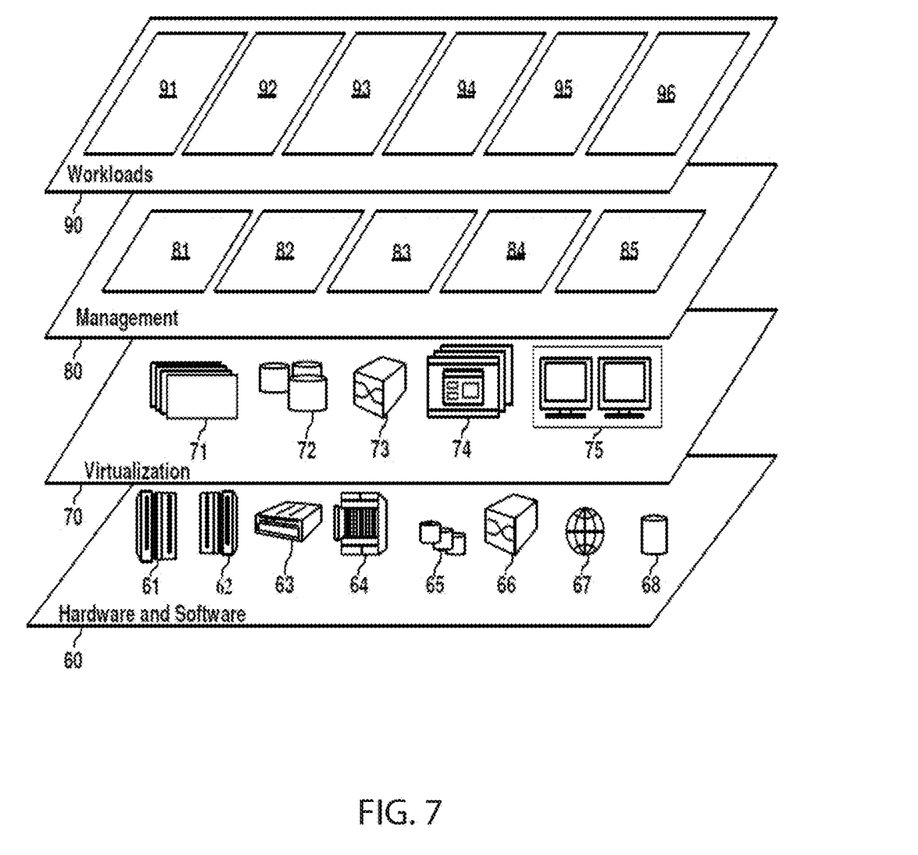
FIG. 7 depicts abstraction model layers, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; camera selection based on a type of photo to be taken 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically selecting an appropriate camera to use for capturing photos and videos, the method comprising:

detecting, by a processor of a computing system, that a camera application loaded on the computing system has been opened by a user;

activating, by the processor, a first camera located on a first side of a mobile device and a second camera located on a second side of the mobile device in response to the detecting, the first camera facing the user and being located on a same side as a main display of the mobile device;

analyzing, by the processor, a feed received from the first camera and a feed received from the second camera to detect whether a face is present in a field of view of the first camera or the second camera;

first determining, by the processor, that the user intends to use the first camera if the face present in the field of view of the first camera that is at a position below the first camera or at an angled orientation to the first camera, and an identity of the user is confirmed, wherein in response to the first determining:

deactivating, by the processor; the second camera in response to the first determining, and displaying, by the processor, the feed received from the first camera on the main display of the mobile device for viewing by the user while using the camera application;

second determining, by the processor, that another user other than the user is operating the camera application to take a standard photograph of the user if the identity of the user is not confirmed when the face is present n the field of view of the first camera, wherein in response to the second determining:

deactivating, by the processor, the second camera in response to the second determining, and displaying, by the processor, the feed received from the first camera on the main display of the mobile device for viewing by the another user while using the camera application.

2. The method of claim 1, wherein the identity of the user is confirmed by identifying, by the processor, the face as that of the user, using facial recognition software loaded on the computing system.

3. The method of claim 1, further comprising: prior to deactivating and displaying as part of the first determining, confirming, by the processor, that the user intends to use the first camera by detecting an object placed over or partially over the second camera.

4. The method of claim 3, wherein the object is a hand, a finger, or thumb of the user as the user holds the mobile device while using the camera application.

5. The method of claim 1, wherein the second camera is a selected as a default if the face is not detected in the field of view of the first camera.

6. The method of claim 1, wherein the detection of the face in the field of view of the first camera requires the face to be within a predetermined proximity to the first camera.

7. The method of claim 1, wherein the analyzing of the feed received from the first camera is performed prior to the analyzing of the feed received from the second camera, to detect whether the face is present in the field of view of the first camera.

8. A computer system, comprising:

a processor;

a memory device coupled to the processor; and a computer readable storage device coupled to the processor, wherein the story device contains program code executable by the processor via the memory device to implement a method for automatically selecting an appropriate camera to use for capturing photos and videos, the method comprising:

detecting, by a processor of a computing system, that a camera application loaded on the computing system has been opened by a user;

activating, by the processor, a first camera located on a first side of a mobile device and a second camera located on a second side of the mobile device in response to the detecting, the first camera facing the user and being located on a same side as a main display of the mobile device;

analyzing, by the processor; a feed received from the first camera and a feed received from the second camera to detect whether a face is present in a field of view of the first camera or the second camera;

first determining, by the processor, that the user intends to use the first camera if the face present in the field of view of the first camera that is at a position below the first camera or at an angled orientation to the first camera, and an identity of the user is confirmed, wherein in response to the first determining:

deactivating, by the processor, the second camera in response to the first determining, and displaying, by the processor, the feed received from the first camera on the main display of the mobile device for viewing by the user while using the camera application;

second determining, by the processor, that another user other than the user is operating the camera application to take a standard photograph of the user if the identity of the user is not confirmed when the face is present in the field of view of the first camera, wherein in response to the second determining:

deactivating, by the processor, the second camera in response to the second determining, and displaying, by the processor, the feed received from the first camera on the main display of the mobile device for viewing by the another user while using the camera application.

9. The computing system of claim 8, wherein the identity of the user is confirmed by identifying, by the processor, the face as that of the user, using facial recognition software loaded on the computing system.

10. The computing system of claim 8, further comprising: prior to deactivating and displaying as part of the first determining, confirming, by the processor, that the user intends to use the first camera by detecting an object placed over or partially over the second camera.

11. The computer system of claim 8, wherein the detection of the face in the field of view of the first camera requires the face to be within a predetermined proximity to the first camera.

12. The computer system of claim 8, wherein the analyzing of the feed received from the first camera is performed prior to the analyzing of the feed received from the second camera, to detect whether the face is present in the field of view of the first camera.

13. A computer program product, comprising a computer readable hardware storage device storing a computer readable program code, the computer readable program code comprising an algorithm that when executed by a computer processor of a computing system implements a method for automatically selecting an appropriate camera to use for capturing photos and videos, comprising:

detecting, by a processor of a computing system, that a camera application loaded on the computing system has been opened by a user;

activating, by the processor, a first camera located on a first side of a mobile device and a second camera located on a second side of the mobile device in response to the detecting, the first camera facing the user and being located on a same side as a main display of the mobile device;

analyzing, by the processor, a feed received from the first camera and a feed received from the second camera to detect whether a face is present in a field of view of the first camera or the second camera;

first determining, by the processor, that the user intends to use the first camera if the face present in the field of view of the first camera that is at a position below the first camera or at an angled orientation to the first camera, and an identity of the user is confirmed, wherein in response to the first determining:

deactivating, by the processor, the second camera in response to the first determining, and displaying, by the processor, the feed received from the first camera on the main display of the mobile device for viewing by the user while using the camera application;

second determining, by the processor, that another user other than the user is operating the camera application to take a standard photograph of the user if the identity of the user is not confirmed when the face is present in the field of view of the first camera, wherein in response to the second determining:

deactivating, by the processor, the second camera in response to the second determining, and displaying, by the processor, the feed received from the first camera on the main display of the mobile device for viewing by the another user while using the camera application.

14. The computer program product of claim 13, wherein the identity of the user is confirmed by identifying, by the processor, the face as that of the user, using facial recognition software loaded on the computing system.

15. The computer program product of claim 13, further comprising: prior to deactivating and displaying as part of the first determining, confirming, by the processor, that the user intends to use the first camera by detecting an object placed over or partially over the second camera.

16. The computer program product of claim 13, wherein the detection of the face in the field of view of the first camera requires the face to be within a predetermined proximity to the first camera.

17. The computer program product of claim 13, wherein the analyzing of the feed received from the first camera is performed prior to the analyzing of the feed received from the second camera, to detect whether the face is present in the field of view of the first camera.

* * * * *